C. AND B. G. DUNCAN.
TIRE PRESSURE DEVICE AND GAGE FOR VULCANIZING MOLDS.
APPLICATION FILED FEB. 25, 1921.
1,391,374.
Patented Sept. 20, 1921.
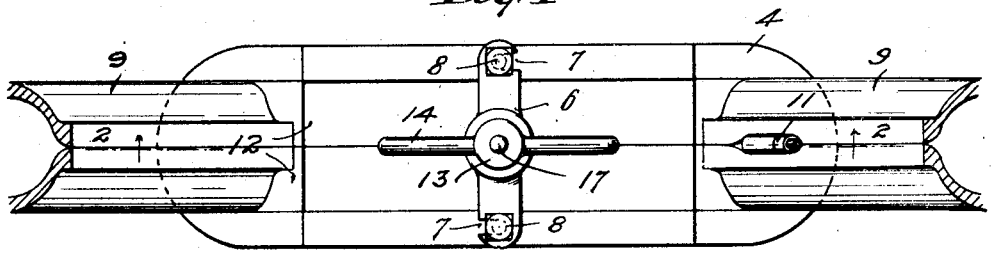
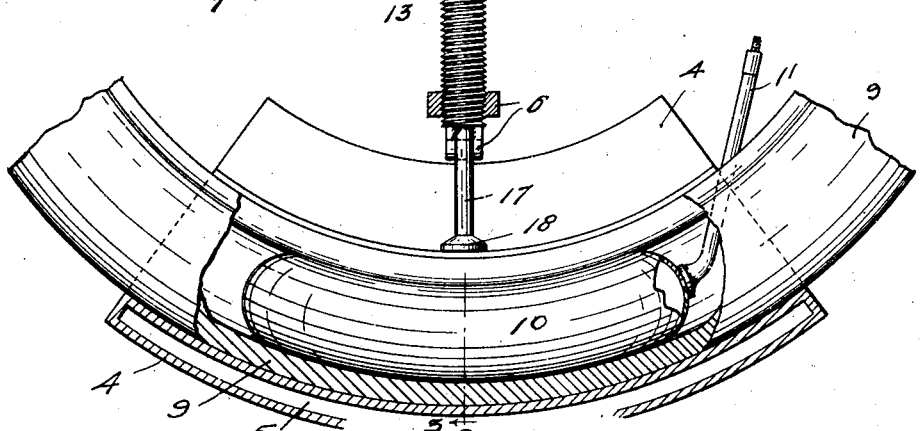
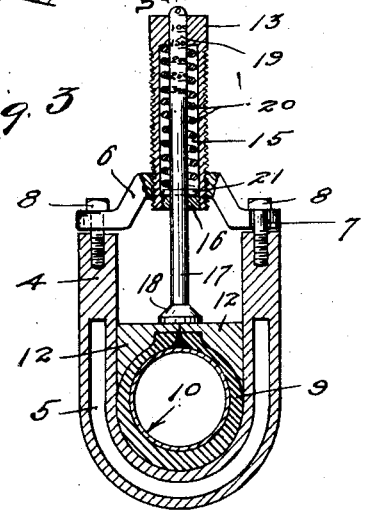
Inventors
Curlaw Duncan
Brougham G. Duncan
By their Attorneys
Merchant-Kilgore & Kilgore

UNITED STATES PATENT OFFICE.

CURLAW DUNCAN AND BROUGHAM G. DUNCAN, OF MINNEAPOLIS, MINNESOTA.

TIRE-PRESSURE DEVICE AND GAGE FOR VULCANIZING MOLDS.

1,391,374.  Specification of Letters Patent.  Patented Sept. 20, 1921.

Application filed February 25, 1921. Serial No. 447,900.

*To all whom it may concern:*

Be it known that we, CURLAW DUNCAN and BROUGHAM G. DUNCAN, are citizens of the United States, residing at Minneapolis, in the county of Hennepin and State of Minnesota, have invented certain new and useful Improvements in Tire-Pressure Devices and Gages for Vulcanizing-Molds; and we do hereby declare the following to be a full, clear, and exact description of the invention, such as will enable others skilled in the art to which it appertains to make and use the same.

Our invention has for its object to provide a tire pressure and gage for the tire vulcanizing molds. In vulcanizing pneumatic tire casings it is now customary to place therein, a bag, preferably one that is expansible and thereafter to place the tire casing in a mold heated by steam or otherwise. Bead irons are then placed between the sides of the mold and the beads of the tire casing, and pressure applied thereto by means of a hand screw having screw-threaded engagement with a yoke spanning the mold and secured thereto. The air bag, if such is used, is then inflated by means of a hose leading from a suitable compressor and having means for coupling the same to a valve-equipped stem on said bag. To determine the pressure in the air bag, the hose must be detached from the stem thereof and a pressure gage applied thereto in the same manner that it would be used in testing a pneumatic tire. As the heat from the mold often expands the air bag to a greater pressure than is desired during the vulcanizing process, or in some instances, the air bag may have a leak so that the pressure in said air bag is reduced, tests must frequently be made with a pressure gage. This testing of the air bags takes considerable time, particularly so when the operator has a number of molds in operation at the same time.

Our invention provides means for clamping a tire in a vulcanizing mold under a predetermined pressure and indicates said pressure, and in case further pressure is applied to the tire by means of an expansible bag, the same is also indicated. The invention is operative, at all times, during the vulcanizing pressure to indicate the pressure in a tire.

To the above end, generally stated, the invention consists of the novel devices and combinations of devices, hereinafter described and defined in the claims.

Referring to the drawings:

Figure 1 is a plan view showing a portion of a pneumatic tire casing in a vulcanizing mold having the invention applied thereto;

Fig. 2 is a view partly in side elevation and partly in vertical section taken on the line 2—2 of Fig. 1; and Fig. 3 is a view principally in transverse section taken on the line 3—3 of Fig. 2.

The numeral 4 indicates a vulcanizing mold having a steam chamber 5 into which steam may be introduced and discharged in the customary manner. Spanning the mold 4 is a yoke 6 detachably secured to the mold by having at its ends, reversely formed notches 7 arranged to receive headed studs 8, by horizontal turning movement of said yoke, said studs being secured in the tops of the walls of said molds centrally between the ends thereof. Held in the mold 4 is a pneumatic tire casing 9 containing an expansible air bag 10 having a check valve-equipped stem 11 which projects from the tire casing between the beads thereof and of the type customarily used in connection with inner tubes of pneumatic tires. Bead irons 12, within the mold 4, loosely rest upon the tire casing 9, as best shown in Fig. 3. The parts thus far described are of standard and well known construction.

The invention includes a cylindrical body member 13 having screw-threaded engagement with the yoke 6 for bodily radial adjustment toward and from the tire casing 9 in the mold 4. On the upper end of the body member 13 is a pair of radial diametrically opposite handles 14, by which said body member may be turned in the yoke 6 to move the same toward and from the bead irons 12. Formed in the body member 13 is a spring chamber 15 open at its bottom and normally closed by a screw plug 16.

A plunger 17 is extended axially through the body member 13, for endwise sliding movement, in seats in the top of said body member and the screw plug 16. On the lower end of the plunger 17 is a head 18 adapted to engage the bead irons 12, as best shown in Fig. 3. The upper end portion of the plunger 17 is graduated at 19, from zero to three hundred, to indicate pressure pounds. Encircling the plunger 17, within the chamber 15, is a coiled spring, compressed between the closed upper end of said chamber and a transverse pin secured in said plunger and normally held against the plug 16 as a stop by the spring 20 with the zero graduation, on said plunger, alined with the upper end of the body member 13, which acts as a coöperating indicator.

In using the invention, as illustrated in the drawings, the air bag 10 is first placed in the tire casing 9 and said casing placed in the mold 4 with the bead irons loosely resting thereon. The yoke 6, which carries the invention, is then interlocked to the mold 4 and the body member 13 screwed down in said yoke by the handles 14 until the plunger head 18 rests on the bead irons 12. A further downward movement of the body member 13 will cause the same to move the plunger 17, which is held by the bead irons 12, and compress the spring 20. As the body member 13 is moved on the plunger 17, the graduations 19 are progressively exposed and indicate the pound pressure applied to the bead irons and, hence, the casing 9. After the desired pressure has been applied in this manner to the casing 9, the bag 10 is inflated in a manner previously described. This inflation of the bag 10 will further increase the pressure in the casing 9 and lift the bead irons 12 and plunger 17 and thereby cause said plunger to move farther upward through the body member 13 and still further increase the tension on the spring 20 and expose progressively increased graduations. The operator may cut off the air supply to the air bag 10 as soon as the graduations on the plunger 17 indicates the desired pressure in the tire.

During the vulcanizing process, the operator may note, at a glance, the pressure in a tire casing as indicated by the gage. In case the pressure increases, due to the heat from the mold, the operator may open the valve in the stem 11 and release the excess pressure, or in case the pressure is reduced, due to leakage, the operator can again apply the air hose to the stem 11 of the air bag and again bring the pressure in said air bag up to normal.

By the use of our invention, the danger of buckling a tire is entirely eliminated for the reason that the operator can apply a known and required pressure to the bead iron.

What we claim is:

1. In a vulcanizing apparatus, the combination with a mold, of a pressure gage operative to put a predetermined pressure on a tire in the mold.

2. In a vulcanizing apparatus, the combination with a mold, of a pressure gage operative to put a predetermined pressure on a tire in the mold and movable to indicate fluctuations in the pressure in the tire.

3. In a vulcanizing apparatus, the combination with a mold and an expansible bag adapted to be placed in a tire casing in the mold, of a pressure gage operative to put a predetermined pressure on said tire casing and bag.

4. In a vulcanizing apparatus, the combination with a mold and an expansible bag adapted to be placed in a tire casing in the mold, of a pressure gage operative to put a predetermined pressure on said tire casing and bag and movable to indicate fluctuations in the pressure in the bag.

5. In a vulcanizing apparatus, the combination with a mold, of a pressure gage having a yieldingly held plunger on which a tire in the mold is operative to indicate the pressure in said tire.

6. In a vulcanizing apparatus, the combination with a mold, of a pressure gage having a yieldingly held plunger and mounted for bodily adjustment to carry said plunger into engagement with a tire in the mold to place the same under a predetermined pressure.

7. In a vulcanizing apparatus, the combination with a mold, of a pressure gage having a yieldingly held plunger, the body of said pressure gage having screw-threaded engagement with a part held in respect to the mold for movement toward a tire in the mold to carry said plunger into engagement with the tire and place the same under a predetermined pressure.

8. In a vulcanizing apparatus, the combination with a mold, and a bag adapted to be placed in a tire casing in the mold and having means whereby the same may be inflated, of a pressure gage having a yieldingly held plunger, the body of the pressure gage having screw-threaded engagement with a part held in respect to the mold for movement toward the tire casing to carry said plunger into engagement therewith and place the same under a predetermined pressure and movable to indicate fluctuations in the pressure in the bag.

9. In a vulcanizing apparatus, the combination with a mold having tire bead irons and a bag adapted to be placed in a tire casing in the mold and having means whereby the same may be inflated, of a pressure gage having a yieldingly held plunger, the body of the pressure gage having screw-threaded engagement with a part held in respect to the mold for movement toward the tire casing to carry said plunger into engagement with the tire bead irons and place the tire casing and bag under a predetermined pressure and movable to indicate fluctuations in the pressure in the bag.

10. In a vulcanizing apparatus, the combination with a mold having tire bead irons, a yoke spanning the mold and removably secured thereto and a bag adapted to be applied in a tire casing in the mold and having means whereby the same may be inflated, of a pressure gage having a yieldingly held plunger, the body of the pressure gage having screw-threaded engagement with the yoke for movement toward the tire casing to carry said plunger into engagement with the tire bead irons and place the tire casing and bag under pressure and movable to indicate fluctuations in the pressure in the bag.

In testimony whereof we affix our signatures.

CURLAW DUNCAN.
BROUGHAM G. DUNCAN.